UNITED STATES PATENT OFFICE.

SAMUEL S. SADTLER, OF MONTGOMERY COUNTY, PENNSYLVANIA, ASSIGNOR TO THE WESTMORELAND CHEMICAL AND COLOR COMPANY, OF PHILADELPHIA, PENNSYLVANIA, A CORPORATION OF PENNSYLVANIA.

PROCESS OF FORMING A BASIC-FERRIC-SULFATE LIQUOR.

1,186,611.     Specification of Letters Patent.     Patented June 13, 1916.

No Drawing.     Application filed April 16, 1913. Serial No. 761,506.

*To all whom it may concern:*

Be it known that I, SAMUEL S. SADTLER, a citizen of the United States, residing in Montgomery county, State of Pennsylvania, have invented a certain new and useful Process of Forming a Basic-Ferric-Sulfate Liquor, of which the following is a specification.

My invention relates to the process of making a basic ferric sulfate liquor which may be used as a mordant for textile fabrics, such as silk, and animal tissues, such as skins or leather.

In the manufacture of ferric oxid from copperas, or desiccated copperas or ferrous sulfate, the copperas is burned in a muffle furnace or retort to produce crude ferric oxid. This oxid is then washed with water and the oxidized iron liquor solution which is drained off constitutes a by-product of the manufacture of ferric oxid. This liquor consists chiefly of ferric sulfate and is the starting point of my process.

The object of my invention is to produce from such by-product an efficient and useful mordant for fibers and tissues of the character above indicated and thereby utilize the same in the manufacture of a valuable and useful commercial product.

In carrying out my invention it is necessary not only to neutralize any free sulfuric acid remaining from the decomposition of the copperas but to cause a substantial quantity of ferric hydroxid to go into solution into the ferric sulfate of the liquor, thereby obtaining a basic ferric sulfate which shall be perfectly soluble but which holds ferric hydroxid loosely combined so that it shall be readily taken up by the fiber or tissue in the mordanting process. This production of a soluble basic ferric sulfate with the qualities desired may be effected in different ways. My preferred method is to add a freshly or newly precipitated and well washed ferric hydroxid magma to the ferric sulfate solution and continue the addition as long as the ferric hydroxid is taken up in solution after stirring in the liquor. In this way no impurities of any kind are introduced and a perfectly soluble uncontaminated basic salt results. I have also obtained my product by the addition of barium or calcium hydroxid to the acid ferric sulfate liquor. This alkaline earth hydroxid first neutralizes the free sulfuric acid and then decomposes some of the neutral ferric sulfate resulting in liberating ferric hydroxid which on stirring goes into solution to form the basic ferric sulfate. The barium sulfate which is formed being insoluble will separate on standing and the clear solution of uncontaminated basic ferric sulfate, which is the product sought for, can be separated therefrom by decantation or filtration. It should be noted that carbonate of barium also may be used in this latter process with the same end result, namely, the liberation of ferric hydroxid which is to dissolve in the ferric sulfate and produce the soluble basic salt.

I claim:—

1. The process of producing basic ferric sulfate from ferric sulfate in aqueous solution which consists in adding barium hydroxid to such solution and thereby forming barium sulfate and liberating ferric hydroxid and allowing the latter to dissolve in an excess of said ferric sulfate solution to produce basic ferric sulfate in solution and thereafter filtering off the said basic ferric sulfate solution from the insoluble barium sulfate.

2. The process of producing basic ferric sulfate from the ferric sulfate liquor obtained by washing the crude ferric oxid produced by the heating of copperas which consists in first neutralizing free acid if any be present in such liquor and then adding barium hydroxid thereby forming barium sulfate and liberating ferric hydroxid and allowing the latter to dissolve in an excess of said liquor to form basic ferric sulfate and then filtering off the clear solution of said basic ferric sulfate from the insoluble barium sulfate In testimony that I claim the foregoing as my invention, I have hereunto signed my name this 15th day of April, A. D. 1913.

SAMUEL S. SADTLER.

In the presence of—
   GEO. H. WEIDNER,
   CARRIE E. KLEINFELDER.